United States Patent
Barrelmeyer et al.

(10) Patent No.: US 8,251,787 B2
(45) Date of Patent: Aug. 28, 2012

(54) SEPARATING UNIT FOR A COMBINE HARVESTER

(75) Inventors: Thomas Barrelmeyer, Halle/Westfalen (DE); Heinz Peters, Warendorf (DE); Christoph Molitor, Guetersloh (DE); Ernst Reineke, Marienfeld (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 13/226,780

(22) Filed: Sep. 7, 2011

(65) Prior Publication Data

US 2012/0064955 A1 Mar. 15, 2012

(30) Foreign Application Priority Data

Sep. 9, 2010 (DE) .......................... 10 2010 037 416

(51) Int. Cl.
*A01F 7/06* (2006.01)
*B02B 3/06* (2006.01)

(52) U.S. Cl. ......................................................... 460/69

(58) Field of Classification Search ............ 460/69, 460/66, 68, 119, 16, 70
See application file for complete search history.

(56) References Cited

U.S. PATENT DOCUMENTS

| | | | | |
|---|---|---|---|---|
| 3,828,793 A * | 8/1974 | Gochanour | ...................... | 460/70 |
| 4,611,605 A * | 9/1986 | Hall et al. | ........................ | 460/80 |
| 4,739,773 A * | 4/1988 | West et al. | ....................... | 460/16 |
| 4,875,891 A * | 10/1989 | Turner et al. | ................... | 460/110 |
| 5,078,646 A * | 1/1992 | Claas et al. | ...................... | 460/69 |
| 5,112,279 A * | 5/1992 | Jensen et al. | ..................... | 460/69 |
| 5,152,717 A * | 10/1992 | Nelson et al. | .................. | 460/122 |
| 5,334,093 A * | 8/1994 | Jensen et al. | ................... | 460/83 |
| 5,342,239 A | 8/1994 | West et al. | | |
| 5,344,367 A * | 9/1994 | Gerber | ............................ | 460/68 |
| 5,445,563 A * | 8/1995 | Stickler et al. | .................. | 460/69 |
| 5,688,170 A * | 11/1997 | Pfeiffer et al. | ................... | 460/69 |
| 6,129,629 A * | 10/2000 | Dammann et al. | ............. | 460/67 |
| 6,152,820 A * | 11/2000 | Heidjann et al. | .............. | 460/112 |
| 6,257,977 B1 * | 7/2001 | Moriarty | ......................... | 460/68 |
| 6,884,161 B2 * | 4/2005 | Moriarty | ......................... | 460/67 |
| 7,070,498 B2 * | 7/2006 | Grywacheski et al. | ......... | 460/68 |
| 7,462,101 B2 * | 12/2008 | Grywacheski et al. | ......... | 460/68 |
| 7,473,170 B2 * | 1/2009 | McKee et al. | .................. | 460/109 |
| 7,717,777 B2 * | 5/2010 | Pope et al. | ...................... | 460/69 |
| 7,731,576 B2 * | 6/2010 | Isaac et al. | ...................... | 460/84 |
| 8,021,219 B2 * | 9/2011 | Pope et al. | ...................... | 460/67 |
| 8,075,377 B2 * | 12/2011 | Pope et al. | ...................... | 460/66 |
| 8,109,815 B2 * | 2/2012 | Hollatz | ........................... | 460/70 |

FOREIGN PATENT DOCUMENTS

EP 0 522 267 1/1993

* cited by examiner

*Primary Examiner* — Arpad Fabian-Kovacs
(74) *Attorney, Agent, or Firm* — Michael J. Striker

(57) ABSTRACT

A separating unit for a combine harvester and operating in accordance with a principle of axial flow, has a housing having at least one separating grate provided with openings, a rotatably supported separating rotor located in the housing, a cover having a closed jacket surface including, on a side facing the separating rotor, a plurality of guide elements disposed next to one another coaxially to a longitudinal axis of the separating rotor and extending in sections in a radial direction of the cover, and at least one ramp-shaped crop flow deflecting element extending axially parallel to the longitudinal axis of the separating rotor and arranged on the side of the jacket surface facing the separating rotor.

11 Claims, 3 Drawing Sheets

SEPARATING UNIT FOR A COMBINE HARVESTER

CROSS-REFERENCE TO RELATED APPLICATION

The invention described and claimed hereinbelow is also described in German Patent Application DE 10 2010 037 416.4 filed on Sep. 9, 2010. This German Patent Application, whose subject matter is incorporated here by reference, provides the basis for a claim of priority of invention under 35 U.S.C. 119(a)-(d).

BACKGROUND OF THE INVENTION

The invention relates to a separating unit for a combine harvester.

A separating unit of the initially stated type is known from EP 0 522 267 B1. The separating unit, which operates according to the principle of axial flow, comprises a rotatably supported separating rotor disposed in a housing, the at least one separating grate which is equipped with openings and forms a separating region of the separating unit, and a cover having a closed jacket surface. The eccentrically disposed cover comprises, on the side thereof facing the separating rotor, a large number of guide elements which are arranged next to one another in a spiral shape coaxially to the longitudinal axis of the separating rotor, and which extend in sections in the radial direction of the cover.

A crop flow supplied to the separating unit rises due to the rotational forces of the separating rotor and moves along the housing in the axial direction and the radial direction, being guided by the separating rotor and the guide elements. The residual grain contained in the threshed mat that forms on the inner side of the housing is separated out in the region of the separating grate. The task of the guide elements arranged in a spiral pattern on the inner side of the cover is to guide the crop that is accelerated in the circumferential direction by the separating rotor to a delivery point. The centrifugal forces produced by the separating rotor act equally on the grain separated from the crop flow and on the straw contained in the crop flow. As a result, a compressing effect of the straw on the separating area of the separating grate can occur and cause a straw mat to form which prevents the grain from emerging from or passing through the straw mat.

The separating output varies depending on various parameters which are specific to the crop and to the separating unit. To increase the separating output of a separating unit described above, it is necessary to enlarge the separating area, increase the separating rotor speed, design the separating grates accordingly, and increase the number of revolutions of the crop in the separating unit. Enlarging the separating areas is constrained by the limited amount of installation space available, and so these measures quickly reach limits. Increasing the separating rotor speed and, therefore, the centrifugal forces is associated with an increase in the power uptake of the separating unit and results in increasing damage to the straw.

SUMMARY OF THE INVENTION

The problem addressed by the invention is that of providing a separating unit of the initially stated type, which is characterized by increased separating output while retaining an existing separating area.

According to the present invention, at least one ramp-shaped crop flow deflection element extending axially parallel to the longitudinal axis of the separating rotor is disposed on the side of the separating jacket facing the separating rotor. Given that the crop flow is lifted off of the surface of the cover by the ramp-shaped crop flow deflection element and is separated and loosened when it subsequently impacts a surface enclosing the separating rotor, the disadvantageous compressing effect described above is reduced.

Due to the effect of separating and loosening the crop flow induced by the crop flow deflection element, the separating rotor speed that is required can be reduced, thereby reducing power uptake and improving straw quality. A further advantage of this configuration is that the separating rotor does not actively convey, at least in the region of the crop flow deflection element, since the crop flow is located outside of the effective diameter of the separating rotor due to the eccentric placement of the cover. The separating unit according to the invention can be a component of a separating unit comprising a threshing-separating rotor which has a threshing region in the axial direction of the combine harvester and a separating area adjacent thereto, and a combination of threshing unit disposed tangentially to the flow of crop through the combine harvester, followed directly by the separating unit which operates according to the principle of axial flow.

Preferably, the at least one crop flow deflection element can be disposed downstream of the guide elements as seen in the circumferential direction of the housing. An unobstructed path is therefore available to the crop flow—which is deflected in the radial direction by the at least one crop flow deflection element—before it impacts the surface of the housing enclosing the separating rotor.

In particular, the at least one crop flow deflection element can extend across the axial extension of the jacket surface of the cover, at least in sections.

Advantageously, the axial extension of the assembly of the at least one crop flow deflection element can correspond to the axial extension of at least one separating grate. In this manner, the crop flow is deflected at least within the separating region formed by the at least one separating grate after every revolution when it emerges between the guide elements arranged in a spiral shape. Preferably, the configuration of the at least one crop flow deflection element extends across the entire extension of the separating region, wherein one continuous crop flow deflection element or a plurality of adjacently disposed crop flow deflection elements can be provided.

Preferably, the angle of inclination of the at least one ramp-shaped crop flow deflection element can be selected such that a crop flow deflected by the crop flow deflection element impacts the surface of the cover. By deflecting the crop flow specifically onto the surface of the cover, the deflected crop can be prevented from striking the surface of the at least one separating grate to become separated, which would result in a higher portion of short straw. The use of the crop flow deflection element has a substantially neutral effect on the load of the cleaning unit.

According to a preferred development, the angle of inclination of the at least one ramp-shaped crop flow deflection element can be selected such that a crop flow deflected by the crop flow deflection element impacts the surface of the separating rotor. As a result, the crop flow is deflected in the direction of the tools of the separating rotor. The meshing of the tools of the separating rotor with the crop flow results in active mixing of the crop flow since the speed at which the crop flows is slower than the circumferential speed of the tools of the separating rotor.

Preferably, the at least one crop flow deflection element can have a closed surface.

Alternatively, the at least one crop flow deflection element can have a surface that is interrupted in sections. The advantage of this alternative is that the straw contained in the crop mat follows the course of the ramp-shaped crop flow deflection element, while the grain contained in the crop mat can fall through the surface which is interrupted in sections, to be subsequently separated out via the separating grate.

For this purpose, the at least one crop flow deflection element can comprise at least one base element for attachment to the inner side of the cover, onto which a large number of parallel, interspaced rods are mounted. The rods are preferably interspaced equidistantly, although an uneven interspacing of the rods as seen in the axial direction of the separating area is also feasible.

In particular, the rods can be arranged in the axial and/or radial direction of the rotor, slanted at an angle relative to the surface of the cover. The trajectory of the deflected crop flow can be influenced in a targeted manner as a result.

Preferably, the crop flow deflection elements can be attachable to the cover in a detachable manner. This makes it possible to easily replace the crop flow deflection elements when wear occurs, and to use different crop flow deflection elements in order to adapt to changing harvesting conditions.

The invention is described in greater detail below with reference to embodiments shown in the drawings.

DESCRIPTION OF THE PREFERRED EMBODIMENTS

Figure 1:
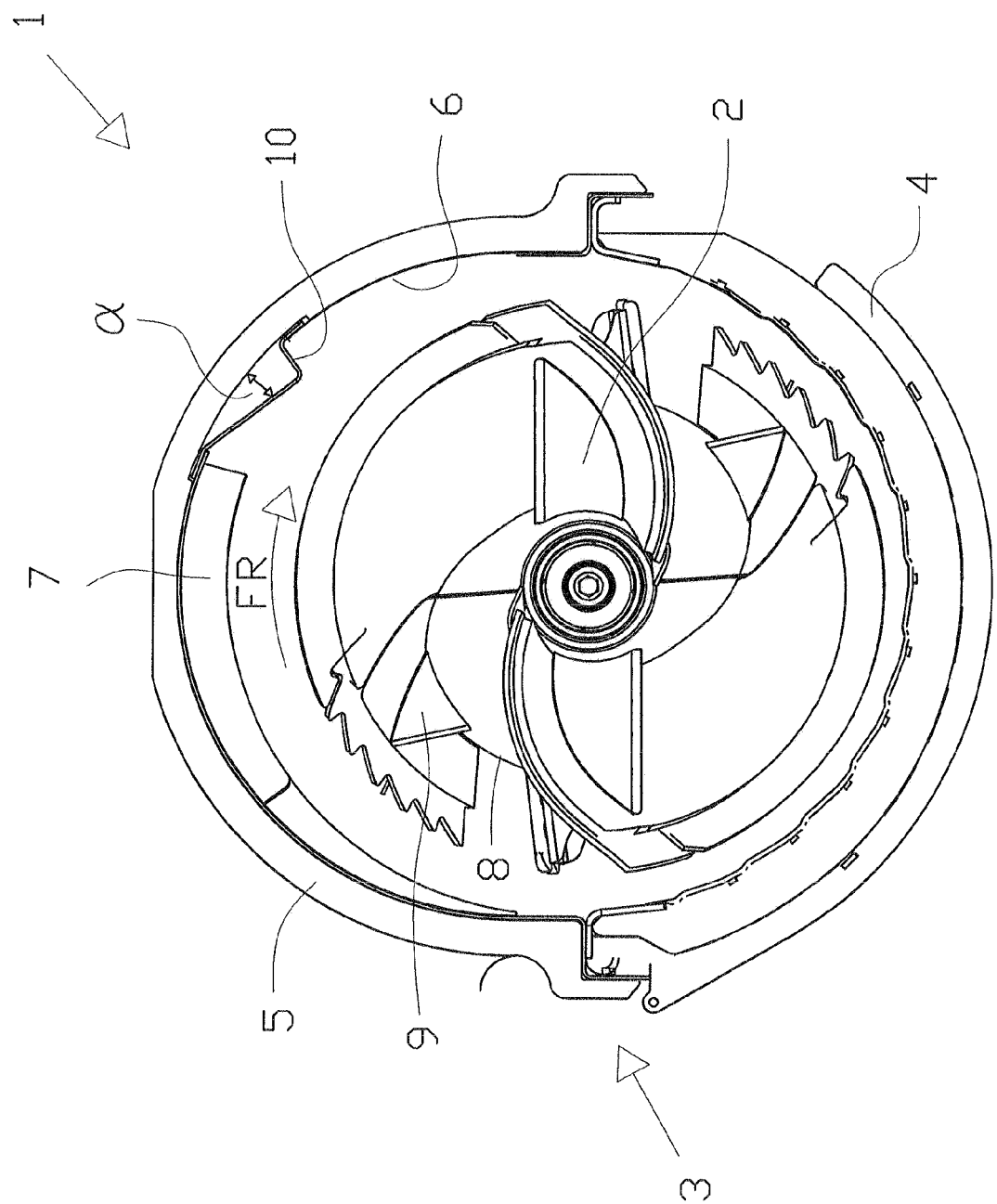
FIG. 1 shows a front view of a separating unit comprising a first embodiment of a crop flow deflection element.

FIG. 1 shows a front view of a separating unit 1 of a combine harvester, which operates according to the principle of axial flow. Separating unit 1 comprises a rotatably supported separating rotor 2 which is enclosed by a housing 3 situated in parallel with separating rotor 2. Housing 3 comprises at least one sieve-type separating grate 4 which forms the separating region of separating unit 1, and a cover 5, each of which encloses separating rotor 2 by approximately half as seen in the circumferential direction. Preferably, a plurality of separating grates 4 are disposed parallel to the longitudinal axis of separating rotor 2 and are arranged one behind the other in the axial direction. Separating rotor 2 is equipped on circumferential surface 8 thereof with driving elements 9 which can have any shape, span circumferential surface 8 in the shape of a spiral, and convey the crop in the axial direction of separating unit 1. One possible radial conveyance direction of material is indicated, as an example, by an arrow labelled "FR", and corresponds to the direction of rotation of separating rotor 2.

The at least one sieve-type separating grate 4 comprises a large number of passages through which grain from a crop flow supplied to separating unit 1 is separated out. Cover 5 comprises—on inner side thereof facing separating rotor 2, which is referred to below as jacket surface 6—a large number of guide elements 7 disposed next to one another coaxially to the longitudinal axis of separating rotor 2, and which extend, in sections, in the radial direction of cover 5. Guide elements 7 are arranged on jacket surface 6 in the shape of a spiral. At least one ramp-shaped crop flow deflection element 10 which extends axially parallel to the longitudinal axis of separating rotor 2 is disposed on jacket surface 6 of cover 5. Crop flow deflection element 10 is disposed on jacket surface 6 downstream of guide elements 7 as seen in the direction of crop flow and in the direction of rotation of separating rotor 2. The at least one crop flow deflection element 10 extends at least approximately across the entire axial extension of jacket surface 6. Ramp-shaped crop flow deflection element 10 has a lead angle $\alpha$, the magnitude of which is decisive for the deflection behavior of the crop that impacts crop flow deflection element 10.

The crop conveyed to separating rotor 2 after threshing, which is composed mainly of grain and non-grain components such as straw, is pressed against jacket surface 6 due to the rotation-induced centrifugal forces, and a compressed crop mat forms as a result. The compression of the crop mat at least reduces the passage of grain contained therein, and so enlarging the separating areas formed by separating grates 4 does not result in a significant increase in separation. Increasing the speed of the separating rotor does not provide an advantage in this regard either, since the result thereof is increased energy uptake and a larger portion of destroyed straw. The ramp-shaped crop flow deflection element 10 on jacket surface 6 causes the crop mat to become separated and loosened after every revolution of the crop material between particular guide elements 7 in that the crop mat is lifted off of jacket surface 6 by ramp-shaped crop flow deflection element 10 and then falls back down onto same.

Lead angle $\alpha$ of ramp-shaped crop flow deflection element 10 is selected such that the crop mat deflected by crop flow deflection element 10 impacts jacket surface 6 after a brief phase of being airborne. The crop mat is separated and loosened when it impacts jacket surface 6, thereby enabling the grain contained therein to move more easily outwardly through the crop mat, due to the centrifugal forces, with every new revolution in separating rotor 2, and to be separated out.

Figure 2:
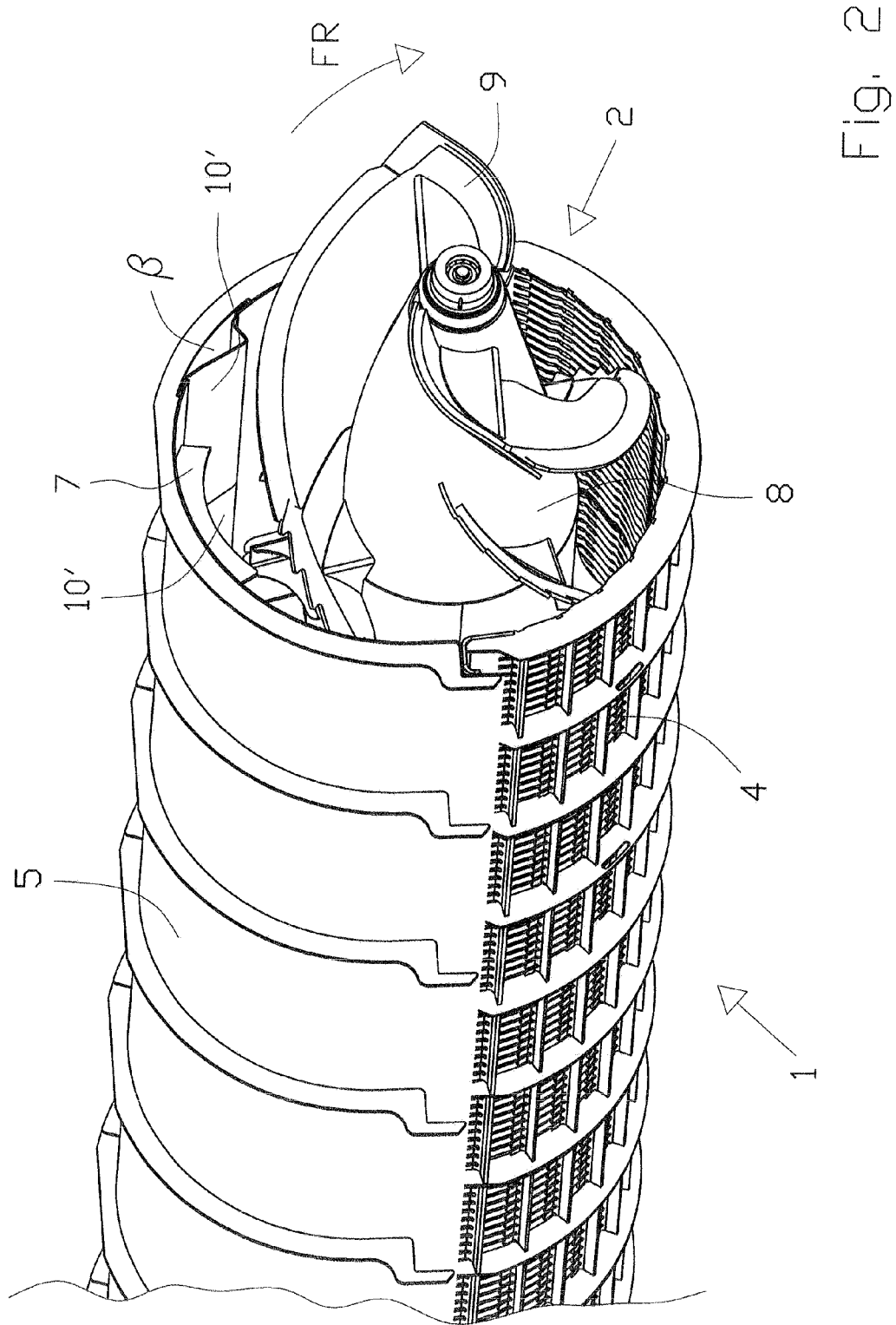
FIG. 2 shows a perspective view of the separating unit comprising a second embodiment of a crop flow deflection element according to FIG. 1.

FIG. 2 shows a second embodiment of a ramp-shaped crop flow deflection element 10' according to FIG. 1. As shown in the illustration, separating unit 1 comprises a plurality of separating grates 4 which are disposed one after the other parallel to the longitudinal axis of separating rotor 2. Crop flow deflection element 10' differs from crop flow deflection element 10 according to FIG. 1 in that lead angle $\beta$ of ramp-shaped crop flow deflection element 10' is selected to be larger than lead angle $\alpha$ of crop flow deflection element 10 according to FIG. 1. Since lead angle $\beta$ is larger, the crop mat undergoes greater deflection, and so the crop mat is deflected in the direction of separating rotor 2. The crop mat enters the effective region of the tools of separating rotor 2, which comb through same. Combing through the crop mat actively mixes it, thereby loosening the mixture of straw and grain components forming the crop mat. A further aspect involved in influencing the crop mat is the extension of crop flow deflection element 10, 10' in the circumferential direction of separating rotor 2. As the extension increases in the radial direction, the dwell time on ramp-shaped crop flow deflection element 10, 10' is varied in order to define the impact point on jacket surface 6 of cover 5 and entry into the effective region of separating rotor 2.

Figure 3:
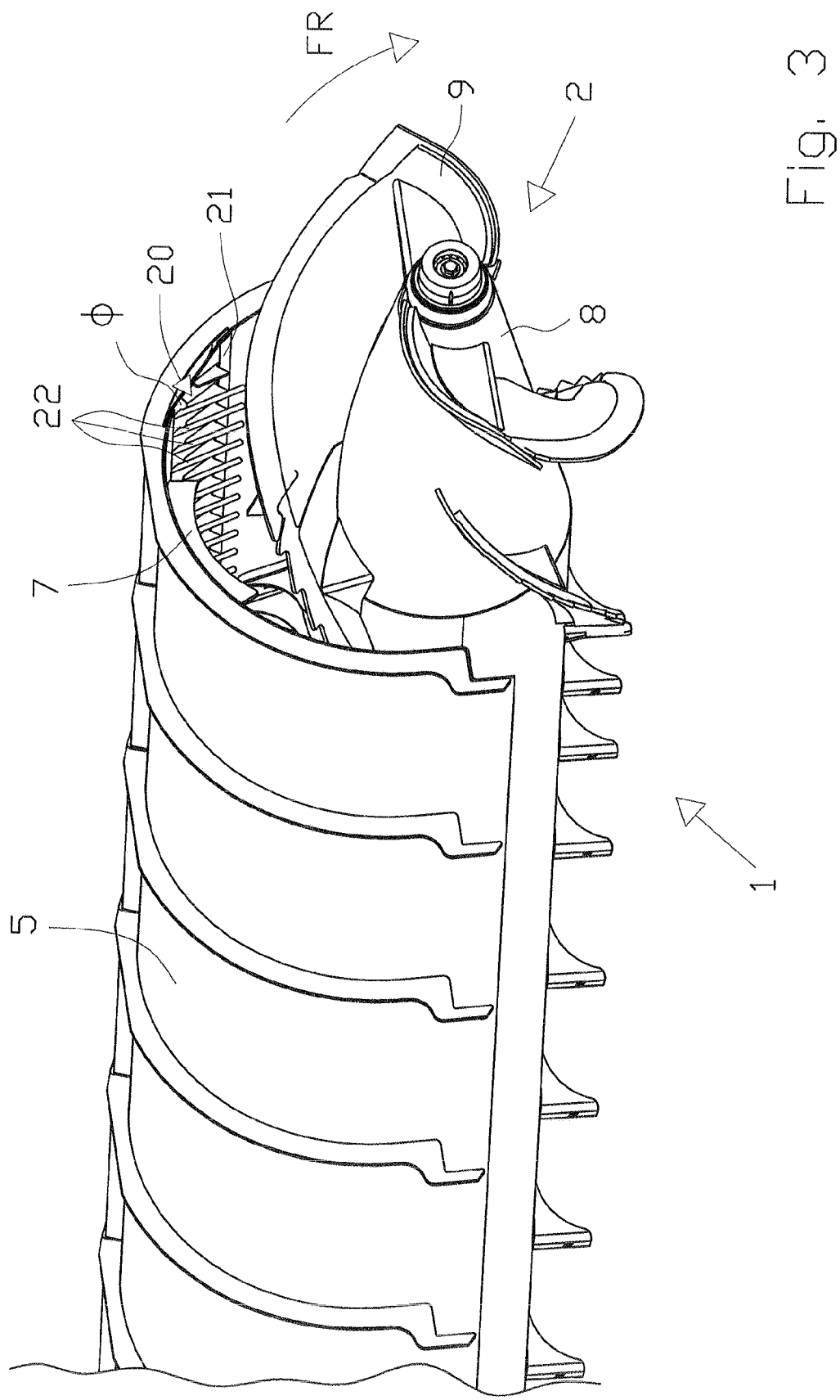
FIG. 3 shows a perspective view of the separating unit according to FIG. 1 comprising a third embodiment of a crop flow deflection element.

The depiction in FIG. 3 shows a perspective view of separating unit 1 according to FIG. 1 comprising a third embodiment of a crop flow deflection element 20. In this embodiment, crop flow deflection element 20 is in the form of a rake or comb. For this purpose, crop flow deflection element 20 comprises a base element 21 for attachment to jacket surface 6 of cover 5. A large number of rods 22 disposed parallel to one another are mounted on base element 21. Rods 22 are arranged in the radial direction of separating rotor 2 at a lead angle φ relative to jacket surface 6 of cover 5, to form a ramp. In addition, rods 22 can be arranged in the axial direction of separating rotor 2 at an angle that corresponds approximately to the angle of inclination of guide elements 7 arranged in the shape of a spiral. The rake- or comb-shaped crop flow deflection element 20 combs through the crop mat and deflects it in accordance with lead angle φ formed by rods 22 and jacket surface 6, in the manner described above. Due to the comb- or rake-type design, the straw contained in the crop mat is deflected by crop flow deflection element 20 and loosened, during which the grain contained therein can be separated out of the crop mat, at least in part, and can fall between the rods onto jacket surface 6 and the surface of separating grate 4. Base element 21 can be omitted if rods 22 would be attached directly to jacket surface 6.

It will be understood that each of the elements described above, or two or more together, may also find a useful application in other types of constructions differing from the types described above.

While the invention has been illustrated and described as embodied in a separating unit for a combine harvester, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A separating unit for a combine harvester and operating in accordance with a principle of axial flow, the separating unit comprising:
    a housing having at least one separating grate provided with openings;
    a rotatably supported separating rotor located in said housing;
    a cover having a closed jacket surface including, on a side facing said separating rotor;
    a plurality of guide elements disposed next to one another coaxially to a longitudinal axis of said separating rotor and extending in sections in a radial direction of said cover; and
    at least one ramp-shaped crop flow deflecting element extending axially parallel to said longitudinal axis of said separating rotor and arranged on said side of said jacket surface facing said separating rotor,
    wherein said at least one crop flow deflection element has an axial extension which corresponds to an axial extension of said at least one separating grate.

2. The separating unit as defined in claim 1, wherein said at least one crop flow deflection element is located at least partially downstream of said guide elements as seen in a circumferential direction of said housing.

3. The separating unit as defined in claim 1, wherein said at least one crop flow deflection element extends, at least in sections, across an axial extension of said jacket surface.

4. The separating unit as defined in claim 1, wherein said at least one ramp-shaped crop flow deflection element has a lead angle such that a crop flow deflected by said crop flow deflection element impacts said cover.

5. The separating unit as defined in claim 1, wherein said at least one ramp-shaped crop flow deflection element has a lead angle such that a crop flow deflected by said crop flow deflection element enters an effective region of said separating rotor.

6. The separating unit as defined in claim 1, wherein said crop flow deflection element has a radial extension which is variable in a circumferential direction of said housing.

7. The separating unit as defined in claim 1, wherein said at least one crop flow deflection element has a closed surface.

8. The separating unit as defined in claim 1, wherein said at least one crop flow deflection element has a surface that is interrupted in sections.

9. The separating unit as defined in claim 8, wherein said at least one crop flow deflection element has at least one base element for attachment to said jacket surface of said cover, on which a plurality of rods disposed parallel to one another are mounted.

10. The separating unit as defined in claim 9, wherein said rods are arranged in a direction selected from the group consisting of an axial direction, a radial direction, and both of said separating rotor, at an angle relative to said jacket surface of said cover.

11. The separating unit as defined in claim 1, further comprising a plurality of said crop flow deflection elements which are detachably attached to said cover.

* * * * *